United States Patent
Tachikawa et al.

(10) Patent No.: US 6,759,074 B2
(45) Date of Patent: Jul. 6, 2004

(54) SOFT CANDY

(75) Inventors: Shizuko Tachikawa, Osaka (JP); Aiko Fujio, Osaka (JP)

(73) Assignee: Mikakuto Co., Ltd., Osaka (JP)

( * ) Notice: Subject to any disclaimer, the term of this patent is extended or adjusted under 35 U.S.C. 154(b) by 207 days.

(21) Appl. No.: 10/176,707

(22) Filed: Jun. 24, 2002

(65) Prior Publication Data

US 2002/0197358 A1 Dec. 26, 2002

(30) Foreign Application Priority Data

Jun. 26, 2001 (JP) ............................. 2001-192842

(51) Int. Cl.$^7$ .................. A23G 3/00; A23L 1/0524
(52) U.S. Cl. .................. 426/576; 426/578; 426/660; 426/661
(58) Field of Search .................. 426/576, 578, 426/660, 661

(56) References Cited

U.S. PATENT DOCUMENTS

| | | | | |
|---|---|---|---|---|
| 4,241,090 A | * | 12/1980 | Stroz et al. | 426/4 |
| 4,556,565 A | * | 12/1985 | Arima et al. | 426/3 |
| 4,911,937 A | * | 3/1990 | Crosello et al. | 426/103 |
| 5,686,107 A | * | 11/1997 | Ratnaraj et al. | 424/464 |
| 5,932,273 A | * | 8/1999 | Yasui | 426/576 |
| 6,004,334 A | * | 12/1999 | Mythen | 606/161 |
| 6,479,082 B1 | * | 11/2002 | Johnson et al. | 426/3 |

* cited by examiner

*Primary Examiner*—N. Bhat
(74) *Attorney, Agent, or Firm*—Armstrong, Kratz, Quintos, Hanson & Brooks, LLP

(57) ABSTRACT

The present invention provides a novel confection, and more particularly a tasty soft candy, which is a soft candy in which gummi is dispersed through a candy base substance with a solid content consisting essentially of one or more saccharides, the moisture content of said base substance being 6 to 20 wt %, and said base substance containing 0.001 to 0.3 wt % crystalline cellulose, and further a soft candy, wherein the solid content of the candy base substance consists essentially of gelatin and one or more saccharides, and gummi with a moisture content of 10 to 20 wt % is dispersed through said base substance at a rate of 5 to 30 wt %.

3 Claims, 1 Drawing Sheet

SOFT CANDY

BACKGROUND OF THE INVENTION

1. Field of the Invention

The present invention relates to a novel confection, and more particularly to a tasty soft candy that offers a novel texture, in which taste is improved without sacrificing fragrance.

2. Description of the Related Art

Candies with a solid content consisting essentially of saccharides, and with a moisture content of 6 to 20 wt %, are widely enjoyed as soft candies. In recent years, however, sales of soft candies have shown a continuing drop from year to year. One of the major reasons that soft candies cannot meet current demands is that such candies stick to the teeth and remain in this stuck condition for a considerable period time. Various solutions to this problem have been proposed. Most of these solutions involve the addition of additives.

However, solutions that use such additives have tended to impair the tastiness of the soft candy itself. The present inventors previously discovered a solution that differs from such methods that depend on additives. Specifically, the present inventors proposed that gummi with a moisture content of 10 to 20 wt % be dispersed through the candy at the rate of 5 to 30 wt % (Japanese Patent Application No. 2000-182538).

The above-mentioned novel soft candy proposed by the present inventors is a soft candy that applies the method of dispersing some type of solid substance in the candy rather than ameliorating the problem of sticking to the teeth by adding various substances to the soft candy as additives, as in conventional methods. Of course, it is necessary that the above-mentioned dispersed solid substance be a solid substance that will not dissolve in the gelatin or saccharides that constitute the composition of the candy, and that this solid substance suit the texture and taste of the candy. As a result of various investigations, the inventors discovered that gummi proves to be extremely well-suited to such candy; furthermore, the problem of sticking to the teeth that arises in soft candy was solved by dispersing gummi which has been pulverized beforehand to a fixed size, or gummi molded into granules, during the manufacturing process of the soft candy.

SUMMARY OF THE INVENTION

In the case of the novel soft candy containing dispersed gummi proposed by the present inventors as described above, even if the candy sticks to the teeth, the gummi remains, so that a clean sensation is felt following eating. It is an object of the present invention to improve even further the soft candy with a novel texture in which the problem of sticking to the teeth is ameliorated as described above, In particular, it is an object of the present invention to improve the flavor of the soft candy without sacrificing the fragrance.

In order to achieve the above-mentioned objects, the present inventors conducted further research. As a result of this research, the inventors discovered that the flavor can be improved to a surprising extent by adding a very small amount of crystalline cellulose as an additive to the previously proposed soft candy base substance, in which the problem of sticking to the teeth is ameliorated by dispersing gummi in the candy base substance.

Specifically, the present invention is a soft candy in which gummi is dispersed through a candy base substance with a solid content consisting essentially of one or more saccharides, the moisture content of this base substance being 6 to 20 wt %, and said base substance containing 0.001 to 0.3 wt % crystalline cellulose.

Furthermore, the present invention is a soft candy in which the solid content of the above-mentioned candy base substance consists essentially of gelatin and one or more saccharides, and gummi with a moisture content of 10 to 20 wt % is dispersed through this base substance at the rate of 5 to 30 wt %.

In the soft candy of the present invention, which is formed by dispersing gummi in the above-mentioned base substance, it is desirable that the size of the above-mentioned gummi be 20 to 80% of the height of the soft candy. In cases where the size of the gummi is less that 20% of the height of the soft candy, the texture of the gummi cannot be felt, and there is also an abrupt drop in the effect of the present invention in preventing sticking to the teeth. On the other hand, in cases where the size of the gummi exceeds 80% of the height of the soft candy, a soft candy texture can hardly be felt.

DESCRIPTION OF THE PREFERRED EMBODIMENTS

Figure 1:
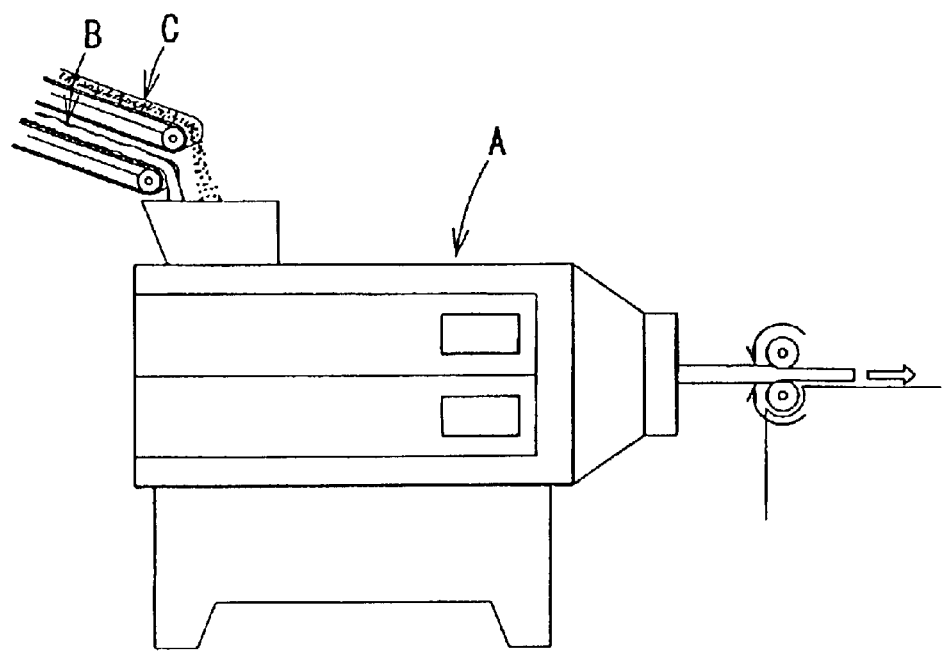
FIG. 1 is an explanatory diagram which shows the extruder that is used to mix the candy base substance and the pulverized gummi or granular gummi, and to mold this mixture into a soft candy that has a specified cross-sectional shape.

In the soft candy of the present invention, gummi is dispersed through a candy base substance with a solid content consisting essentially of one or more saccharides.

One or more saccharides selected from a set consisting of sugar, glucose, fructose, high-fructose corn syrup (fructose content 42%), high-fructose corn syrup (fructose content 55%), sugar-added high-fructose corn syrup (42%), sugar-added high-fructose corn syrup (55%), lactose, sugar alcohol, starch syrup and powdered starch syrup can be used as the above-mentioned saccharides. It is desirable that the saccharide content in the candy base substance be in the range of 70 to 90 wt %.

The moisture content of the above-mentioned base substance is in the rage of 6 to 20 wt %. In cases where the moisture content of the base substance is less than 6 wt %, there is no soft texture; on the other hand, if the moisture content exceeds 20 wt %, the gummi is not favorably dispersed through the base substance. A more desirable moisture content is in the range of 6 to 15 wt %.

Furthermore, the candy base substance used in the soft candy of the present invention may also consist essentially of gelatin and one or more saccharides.

Pig skin gelatin, cow bone gelatin, fish gelatin or the like may be used as the above-mentioned gelatin. It is desirable that the gelatin content in the candy base substance be in the range of 0.2 to 10 wt %.

In the soft candy of the present invention, gummi is dispersed through the above-mentioned base substance. The moisture content of this gummi is 3 to 30 wt %, and more preferably 10 to 20 wt %. It is desirable that this moisture content be determined in connection with the moisture content of the soft candy. For example, in cases where the moisture content of the gummi is less than 3 wt %, the gummi is too hard, and produces a strange texture. On the other hand, if the moisture content of the gummi exceeds 30 wt %, the shape retention of the gummi in the soft candy is lost, and the gummi texture as an integral part of the soft candy cannot be obtained. Furthermore, the amount of gummi that is dispersed through the base substance of the soft candy is 5 to 30 wt % of the total amount of soft candy. In cases where this gummi content is less than 5 wt %, there is no gummi texture, and amelioration of the problem of sticking to the teeth cannot be achieved. On the other hand, if the gummi content exceeds 30 wt %, there is no soft candy texture; instead, there is a sensation that gummi alone is being eaten. Accordingly, although this content also depends on the composition and fragrance of the soft candy, it is desirable that the gummi content that is dispersed through the soft candy be in the range of 5 to 30 wt % of the total amount of the soft candy, and a content in the range of 10 to 20 wt % is preferable.

Furthermore, in the soft candy of the present invention, the above-mentioned candy base substance with a solid content consisting essentially of one or more saccharides or the candy base substance with a solid content consisting essentially of gelatin and one or more saccharides contains 0.001 to 0.3 wt % crystalline cellulose. Crystalline cellulose can be obtained by hydrolyzing high-purity wood pulp with an acid, removing the non-crystalline regions, and purifying and drying the resulting product. This substance has an emulsifying and stabilizing function, a suspension stabilizing function and a viscosity adjusting function, and is added to various types of food products. For example, in the case of ice cream, this substance is used to inhibit whey separation without increasing the viscosity; furthermore in the case of cocoa beverages, this substance is used to prevent the settling of suspended particles without increasing the viscosity, and in the case of fruit jellies, this substance is used to prevent the separation of water and impart a sensation of fruit flesh. However, no examples of the addition of this substance in order to improve the flavor of soft candy have been seen. Specifically, the soft candy previously proposed by the present inventors, in which the problem of sticking to the teeth was ameliorated, was a completely novel soft candy in which gummi was dispersed. However, the present invention is a soft candy in which the flavor is greatly improved by further adding a very small amount of crystalline cellulose to the above-mentioned novel soft candy.

In cases where polymers other than crystalline cellulose, e.g., fibers, starch, low-DE starch syrup or the like, are used, the fragrance is masked by these polymers so that there is no top fragrance. A bottom taste is present, but this does not result in an appealing flavor. On the other hand, in the case of the soft candy of the present invention, which uses crystalline cellulose, the flavor can be improved without sacrificing the fragrance. Of course, the present invention is not adversely affected even if the above-mentioned substances are added with crystalline cellulose as an essential component.

For example, "Avicel", "Ceolus", "Ceolus Cream" (all commercial names) and the like manufactured by Asahi Kasei K. K. may be used as concrete examples of the above-mentioned crystalline cellulose. If the content of crystalline cellulose in the base substance exceeds 0.3 wt %, the grainy sensation of the crystalline cellulose is increased, which is a drawback. If this content is less than 0.001 wt %, no effect whatsoever can be seen. An even more desirable range for the amount to be added is 0.05 to 0.15 wt %.

Furthermore, it is desirable that the size of the gummi that is dispersed through the above-mentioned soft candy of the present invention be 20 to 80% of the height of the soft candy. This suitable size range for the gummi is related to the suitable range of the gummi texture and the effect of ameliorating the problem of sticking to the teeth. Gummi is generally manufactured by filling a starch molding with a gelatin solution, and then removing the surface starch after drying. A suitably-sized mold may be prepared for the present invention. Alternatively, a method in which a large gummi is manufactured, and this gummi is then pulverized using an appropriate machine, may also be used. In this case, if the gummi is large, there is a conspicuous deterioration in the external appearance when the gummi is molded into the soft candy. On the other hand, if the gummi is too small, the presence of the gummi cannot be felt. Accordingly, it is desirable that the size of the gummi be 20 to 80% of the height of the final soft candy, and a size range of 30 to 70% is even more desirable.

Furthermore, besides the above-mentioned essential components, vegetable or animal fats, gelatin or fondant generally used to prevent sticking to the teeth, flavorings, colorings, tart flavoring components, carboxylates used to adjust the pH, chain-form compounds originating in starch other than the compounds described above, vitamin agents, calcium agents, protein agents, salts, flavorings, fruit juices, animal and vegetable extracts and processed products of the same, dried animal and vegetable substances and processed products of the same, processed gelatin products, processed products of thickening polysaccharides and the like may also be added to the base substance of the soft candy of the present invention. Furthermore, gelling agents such as gum arabic, pectin, agar, carrageenan, locust bean gum, guar gum, tamarind seed polysaccharides, karaya gum, traganth gum, xanthan gum, pullulan, gelan gum, curdlan and the like, as well as flavorings, colorings and tart flavoring components or the like, may also be added to the gummi that is dispersed through the above-mentioned base substance.

In the working of the present invention, sodium lactate, calcium lactate, sodium citrate, potassium hydrogen L-tartrate and the like may be cited as examples of carboxylates; pregelatinized starch, indigestible dextrin, polydextrose and the like may be cited as examples of chain-form compounds originating in starch; egg-white albumen, whey, soybean protein, gluten and the like may be cited as examples of protein agents; herb extracts, polyphenols, collagen, gum, concentrated fruit juices and the like may be cited as examples of animal or vegetable extracts and processed products of the same; dried vegetables, dried fruits, spices, cocoa, dried milk and the like may be cited as examples of dried animal or vegetable products and processed products of the same; gelatin jelly, gelatin capsules, marshmallow and the like may be cited as examples of processed gelatin products; and pectin jelly, fruit jams, fruit sauces, pullulan sheets and the like may be cited as examples of processed products of thickening polysaccharides.

Furthermore, in a preferred aspect of the present invention, frappe is included in order to produce a difference in textures between the gummi and the soft candy. Frappe refers to a foam candy in which a preparation obtained by foaming a liquid swollen with a foaming agent is fixed with a candy cooked at a low boil. Protein agents such as whey protein, gluten, soybean protein, egg white or the like can be used as the above-mentioned foaming agent. The subsequent addition of frappe foam masses results in a texture which is soft in relation to the moisture content of the soft candy, and hence the difference in textures between the candy and the gummi can be felt. The moisture content of the frappe may be 3 to 80 wt %. However, if the moisture content is large, the temperature to be reached by the soft candy itself must be set at an extremely high value, whereas if the moisture content is small, intermediate working processes become difficult. The most desirable moisture content range is 10 to 30 wt %.

For example, in order to manufacture the soft candy of the present invention, the separately prepared candy base substance and gummi are kneaded together and molded into an appropriate shape. First, in concrete terms, gummi that has been formed into the above-mentioned specified size by a conventional universally known method is finely pulverized by means of a pulverizing machine, thus producing pulverized gummi with a specified particle size. Meanwhile, the candy base substance is prepared by mixing and dissolving sugar, starch syrup, crystalline cellulose, chain-form compounds originating in starch, vitamin agents, calcium agents, protein agents, salts, flavorings, fruit juices, animal or vegetable extracts or processed products of the same, dried animal or vegetable products or processed products of the same, processed gelatin products, processed products of thickening polysaccharides and the like, then by mixing gelatin with this mixture, stirring in appropriate amounts of tart flavoring agents, flavorings and the like, cooling this mixture, and then performing further mixing.

Figure 2:
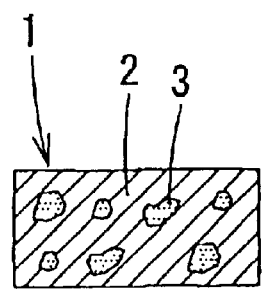
FIG. 2 is a sectional view of one embodiment of the soft candy of the present invention.

Using the gummi and candy base substance prepared as described above, the candy base substance and pulverized gummi are respectively introduced into an extruder A, as shown in FIG. 1 for example, by supply conveyors B and C while regulating the feed amounts. These ingredients are kneaded together and extruded in a predetermined cross-sectional shape. The extruded product is cut to a fixed length, thus producing the gummi-containing soft candy of the present invention. FIG. 2 shows one example of a soft candy manufactured in this way. In the present embodiment, the shape of the soft candy 1 is a rectangular solid shape with a length and width of 20 mm and a height of 8 mm. Pulverized gummi 3 is dispersed throughout the interior of the candy base substance 2. It is also possible to use granular gummi molded beforehand into a small size instead of the pulverized gummi 3.

Next, the present invention will be described in detail in terms of examples. However, the present invention is by no means limited to these examples. Note that in the following description of the examples, "parts" indicate parts by weight.

EXAMPLE 1

First, the gummi was manufactured as follows: 33 parts of sugar, 44 parts of starch syrup, 13 parts of gelatin and 4.5 parts of gum arabic were heated and dissolved, and this mixture was concentrated under reduced pressure. 5 parts of orange juice, 0.4 parts of tart flavoring and a small amount of flavoring were added and uniformly mixed. Using a precision filling machine, a starch mold with a specified volume was filled with this mixture, and the mixture was dried. Afterward, de-powdering and oiling were performed, thus producing a granular gummi. In this case, the mean unit weight of the finished gummi was set at 0.2 g. The moisture content of the gummi thus obtained was 13 wt %, and the gummi had a projectile shape with a diameter of 7 mm and a height of 5 mm.

Meanwhile, 26 parts of sugar, 40 parts of starch syrup, 1.2 parts of Ceolus Cream (manufactured by Asahi Kasei K.K.), 8 parts of concentrated yogurt, 7 parts of fat and 0.5 parts of an emulsifying agent were boiled down to a moisture content of 5% in a vacuum cooker. Next, 2.4 parts of gelatin, 0.7 parts of tart flavoring and 0.4 parts of flavoring were mixed into this mixture using a pressurized mixer. Furthermore, 3.7 parts of frappe and 3 parts of fondant were mixed into this mixture by means of a kneader, and the resulting mixture was aged overnight, thus producing a soft candy base substance. The moisture content of this base substance was 7.5 wt %, and the content of crystalline cellulose was 0.12 wt %.

The soft candy base substance and granular gummi prepared as described above were supplied to an extruder so that the gummi content was 14 wt % relative to the total weight, and the resulting product that was extruded and stretched while being mixed was cut, thus molding the product into the shape of a rectangular solid with a length and width of 20 mm and a height of 8 mm, which was packaged.

Comparative Example 1

24 parts of sugar, 37 parts of starch syrup, 8 parts of concentrated yogurt, 6 parts of fat and 0.4 parts of an emulsifying agent were boiled down to a moisture content of 5% in a vacuum cooker. Next, 2 parts of gelatin, 0.6 part of tart flavoring and 0.3 parts of flavoring were mixed in using a pressurized mixer. Furthermore, 3.7 parts of frappe and 3 parts of fondant were mixed into this mixture by means of a kneader, and the resulting mixture was aged overnight, thus producing a soft candy base substance. This was molded to the same size and shape as in Example 1, and was packaged.

Comparative Example 2

24 parts of sugar, 37 parts of starch syrup, 8 parts of concentrated yogurt, 6 parts of fat and 0.4 parts of an emulsifying agent were boiled down to a moisture content of 5% in a vacuum cooker. Next, 2 parts of gelatin, 0.6 part of tart flavoring and 0.3 parts of flavoring were mixed in using a pressurized mixer. Furthermore, 3.7 parts of frappe and 3 parts of fondant were mixed into this mixture by means of a kneader, and the resulting mixture was aged overnight, thus producing a soft candy base substance. The soft candy base substance thus obtained and the granular gummi obtained in the same manner as in Example 1 were supplied to an extruder; this mixture was molded to the same size and shape as in Example 1 and packaged.

The gummi-containing soft candy of Example 1 produced a novel texture and the problem of sticking to the teeth was ameliorated compared to Comparative Example 1, which did not contain gummi or Ceolus Cream (crystalline cellulose). Furthermore, the soft candy of Example 1 showed an improved sensation of milk with a yogurt flavor compared to Comparative Example 2, which did not contain Ceolus Cream (crystalline cellulose). Thus in this example, the texture was improved, and the sensation of milk as a flavor was enhanced.

EXAMPLE 2

A soft candy was manufactured in the same manner as in Example 1, except for the fact that grape juice was used instead of the orange juice used in Example 1. The soft candy thus obtained showed a novel texture, and an improved milk-like sensation compared to cases in which no Ceolus Cream (crystalline cellulose) was added. Furthermore, the soft candy also showed an attractive appearance, with purple scattered on a white background.

EXAMPLES 3 and 4

Soft candies in which the same gummi as in Examples 1 and 2 was dispersed were manufactured in the same manner as in Example 1, except for the fact that concentrated cream was used instead of the concentrated yogurt used in Example 1, so that a soft candy with a milk flavor was used as a base substance. The resulting gummi-containing soft candy produced a novel texture with an improved milk sensation compared to cases in which Ceolus Cream (crystalline cellulose) was not added. Thus, the milk sensation of the flavor was improved in the case of this example.

EXAMPLE 5

A gummi was manufactured as follows: 30 parts of sugar, 46 parts of starch syrup, 13 parts of gelatin and 5.5 parts of gum arabic were heated and dissolved, and this mixture was concentrated under reduced pressure. 4 parts of apple juice, 1.4 parts of tart flavoring, a coloring and a small amount of flavoring were added and uniformly mixed. Using a precision filling machine, a starch mold with a specified volume was filled with this mixture, and the mixture was dried. Afterward, de-powdering and oiling were performed, thus producing a granular gummi. In this case, the mean unit weight of the finished gummi was set at 0.2 g. The moisture content of the gummi thus obtained was 13 wt %, and the gummi had a projectile shape with a diameter of 7 mm and a height of 5 mm.

Meanwhile, 28 parts of sugar, 37 parts of starch syrup, 1.5 parts of Ceolus Cream (manufactured by Asahi Kasei K.K.), 7 parts of condensed milk, 6 parts of fat and 0.4 parts of an emulsifying agent were boiled down to a moisture content of 5% in a vacuum cooker. Next, 4 parts of cocoa powder, 2 parts of gelatin and 0.3 parts of flavoring were mixed in using a pressurized mixer. Then, 3.7 parts of frappe and 3 parts of fondant were mixed into this mixture by means of a kneader, and the resulting mixture was aged overnight, thus producing a soft candy base substance. The moisture content of this base substance was 7.2 wt %, and the crystalline cellulose content in the base substance was 0.15 wt %.

The soft candy base substance and granular gummi prepared as described above were supplied to an extruder so that the gummi content was 12 wt % relative to the total weight, and the resulting product that was extruded and stretched while being mixed was cut, thus molding the product into the shape of a rectangular solid with a length and width of 18 mm and a height of 12 mm, which was packaged. The gummi-containing soft candy thus obtained showed an amelioration of the problem of sticking to the teeth and a novel texture, and was a chocolate-flavored soft candy in which the milk sensation was improved compared to cases in which no crystalline cellulose was added.

EXAMPLE 6

A soft candy was manufactured in the same manner as in Example 5, except that the gummi was prepared using cherry juice instead of the apple juice used in Example 5. The soft candy thus obtained showed a novel texture, and an improved milk-like sensation compared to cases in which no Ceolus Cream (crystalline cellulose) was added. Furthermore, the soft candy also showed an attractive appearance, with red scattered through a chocolate color.

EXAMPLES 7 and 8

Soft candies in which the same gummi as that used in Examples 5 and 6 was dispersed were manufactured in the same manner as in Example 5, except for the fact that strawberry powder was used instead of the chocolate powder used in Examples 5 and 6, so that a strawberry-flavored soft candy was used as the base substance. The gummi-containing soft candy thus obtained showed an amelioration of the problem of sticking to the teeth and a novel texture, and was a strawberry-flavored soft candy in which the milk sensation was improved compared to cases in which no crystalline cellulose was added.

EXAMPLE 9

First, a gummi was manufactured as follows: 33 parts of sugar, 46 parts of starch syrup, 11 part of gelatin and 0.5 parts of pectin were heated and dissolved, and this mixture was concentrated under reduced pressure. 5 parts of orange juice, 0.4 parts of tart flavoring and a small amount of flavoring were added and uniformly mixed. Using a precision filling machine, a starch mold with a specified volume was filled with this mixture, and the mixture was dried. Afterward, de-powdering and oiling were performed. In this case, the mean unit weight of the finished gummi was set at 0.3 g.

Meanwhile, 27 parts of sugar, 43 parts of starch syrup, 1.5 parts of Ceolus Cream (manufactured by Asahi Kasei K.K.), 8 parts of concentrated yogurt, 7 parts of fat, 0.5 parts of an emulsifying agent, 0.2 parts of sodium lactate and 0.1 parts of calcium lactate were boiled down to a moisture content of 5% in a vacuum cooker. Next, 2.4 parts of gelatin, 0.8 parts of tart flavoring and 0.5 parts of flavoring were mixed in using a pressurized mixer. Furthermore, 5 parts of frappe and 4 parts of fondant were mixed into this mixture by means of a kneader, and the resulting mixture was aged overnight. The soft base substance thus obtained and the previously manufactured gummi were stretched while being mixed by means of an extruder, and were thus molded into a square shape with dimensions of 1 cm×0.5 mm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 10

A soft candy was manufactured in the same manner as in Example 9, except for the fact that the gummi was prepared using strawberry jam instead of the orange juice used in Example 9. The soft candy thus obtained produced a novel texture with an enhanced milk sensation, and showed an attractive appearance with scattered red on a white background.

EXAMPLES 11 and 12

Soft candies in which the same gummi as that used in Examples 9 and 10 was dispersed were manufactured in the same manner as in Example 9 except for the fact that powdered milk was used instead of the concentrated yogurt used in Example 9, so that a soft candy with a different flavor was used as the base substance. The resulting gummi-containing soft candies produced a novel texture.

EXAMPLE 13

A gummi was manufactured as follows: 34 parts of sugar, 46 parts of starch syrup, 10 parts of gelatin and 0.3 parts of gelan gum were heated and dissolved, and this mixture was concentrated under reduced pressure. 5 parts of peach juice, 0.5 parts of tart flavoring, 0.2 parts of sodium citrate, a coloring and a small amount of flavoring were added and uniformly mixed. Using a precision filling machine, a starch mold with a specified volume was filled with this mixture, and the mixture was dried. Afterward, de-powdering and oiling were performed. In this case, the mean unit weight of the finished gummi was set at 0.25 g.

Meanwhile, 28 parts of sugar, 43.4 parts of starch syrup, 0.1 parts of Avicel (manufactured by Asahi Kasei K.K.), 8 parts of concentrated yogurt, 7 parts of fat, 0.5 parts of an emulsifying agent, 0.2 parts of sodium citrate and 0.1 parts of calcium lactate were boiled down to a moisture content of 5% in a vacuum cooker. Next, 3.3 parts of gelatin, 0.8 parts of tart flavoring and 0.5 parts of flavoring were mixed in using a pressurized mixer. Furthermore, 4 parts of frappe and 4 parts of fondant ware mixed into this mixture by means of a kneader, and the mixture was then aged overnight. The soft base substance thus obtained and the previously manufactured gummi were stretched while being mixed by means of an extruder, and were thus molded into a square shape with dimensions of 1 cm×0.5 mm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 14

A soft candy was manufactured in the same manner as in Example 13 except for the fact that the gummi was prepared using strawberry juice instead of the peach juice used in Example 13. The soft candy thus obtained produced a novel texture with an enhanced milk sensation, and showed an attractive appearance with scattered red on a white background.

EXAMPLES 15 and 16

Soft candies in which the same gummi as that used in Examples 13 and 14 was dispersed were manufactured in the same manner as in Example 13, except for the fact that powdered milk was used instead of the concentrated yogurt used in Example 13, so that a soft candy with a different flavor was used as the base substance. The resulting gummi-containing soft candy produced a novel texture.

EXAMPLE 17

A gummi was manufactured as follows: 50 parts of sugar and 10 parts of tamarind seed polysaccharides were mixed as powders; then, a sufficient amount of water was added, and these ingredients were heated and dissolved. Next, 35 parts of sorbitol and 4 parts of muscat juice were added, and this mixture was concentrated under reduced pressure. Then, 1 part of tart flavoring, a coloring and a small amount of flavoring were added and uniformly mixed. A tray was filled with this mixture in sheet form, and the mixture was dried. Afterward, the product was cut into 5 mm squares and oiled.

Meanwhile, 27 parts of sugar, 43 parts of starch syrup, 1.5 part of Ceolus Cream (manufactured by Asahi Kasei K.K.), 8 parts of concentrated yogurt, 7 parts of fat, 0.5 parts of an emulsifying agent, 0.2 parts of sodium lactate and 0.1 parts of potassium hydrogen L-tartarate were boiled down to a moisture content of 5% in a vacuum cooker. Next, 2.4 parts of gelatin, 0.8 parts of tart flavoring and 0.5 parts of flavoring were mixed in using a pressurized mixer. Furthermore, 5 parts of frappe and 4 parts of fondant were mixed into this mixture by means of a kneader, and the resulting mixture was aged overnight. The soft base substance thus obtained and the previously manufactured gummi were stretched while being mixed by means of an extruder, and were thus molded into a square shape with dimensions of 1 cm×1 cm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 18

A soft candy was manufactured in the same manner as in Example 17, except for the fact that the gummi was prepared using grape juice instead of the muscat juice used in Example 17. The soft candy thus obtained produced a novel texture with an enhanced milk sensation, and showed an attractive appearance with scattered purple on a white background.

EXAMPLES 19 and 20

Soft candies in which the same gummi as that used in Examples 17 and 18 was dispersed were manufactured in the same manner as in Example 17, except for the fact that condensed milk was used instead of the concentrated yogurt used in Example 17, so that a soft candy with a milk flavor was used as the base substance. The resulting gummi-containing soft candies produced a novel texture.

EXAMPLE 21

A gummi was manufactured as follows: 33 parts of sugar, 46 parts of starch syrup, 8 parts of gelatin and 3 parts of tamarind seed polysaccharides were heated and dissolved, and this mixture was then concentrated under reduced pressure. 5 parts of lemon juice, 0.6 parts of tart flavoring, a coloring and a small amount of flavoring were added to this and uniformly mixed. Using a precision filling machine, a starch mold with a specified volume was filled with this mixture, and the mixture was dried. Afterward, de-powdering and oiling were performed. In this case, the mean unit weight of the finished gummi was set at 0.3 g.

Meanwhile, 27 parts of sugar, 42 parts of starch syrup, 1.5 parts of Ceolus Cream (manufactured by Asahi Kasei K.K.), 8 parts of concentrated yogurt, 1 part of honey, 7 parts of fat, 0.5 parts of an emulsifying agent, 0.2 parts of sodium lactate and 0.1 parts of calcium lactate were boiled down to a moisture content of 5% in a vacuum cooker. Next, 2.4 parts of gelatin, 0.8 parts of tart flavoring and 0.5 parts of flavoring were mixed in using a pressurized mixer. Furthermore, 5 parts of frappe and 4 parts of fondant were mixed in by means of a kneader, and the resulting mixture was aged overnight. The soft base substance thus obtained and the previously manufactured gummi were stretched while being mixed by means of an extruder, and were thus molded into a square shape with dimensions of 1 cm×0.5 mm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 22

A soft candy was manufactured in the same manner as in Example 21, except for the fact that orange juice was used instead of the lemon juice used in Example 21. The soft candy thus obtained produced a novel texture with an enhanced milk sensation, and showed an attractive appearance with scattered orange on a white background.

EXAMPLES 23 and 24

Soft candies in which the same gummi as that used in Examples 21 and 22 was dispersed were manufactured in the same manner as in Example 21, except for the fact that condensed milk was used instead of the concentrated yogurt used in Example 21, so that a soft candy with a different flavor was used as the base substance. The resulting gummi-containing soft candies produced a novel texture.

EXAMPLE 25

A gummi was manufactured as follows: 34 parts of sugar, 36 parts of starch syrup, 12 parts of high-fructose corn syrup (fructose content 55%), 8.5 parts of gelatin and 1 part of pullulan were heated and dissolved, and this mixture was then concentrated under reduced pressure. 4 parts of blueberry juice, 0.4 parts of tart flavoring, a coloring and a small amount of flavoring were added and uniformly mixed. Using a precision filling machine, a starch mold with a specified volume was filled with this mixture, and the mixture was dried. Afterward, de-powdering and oiling were performed. In this case, the mean unit weight of the finished gummi was set at 0.2 g.

Meanwhile, 27 parts of sugar, 43 parts of starch syrup, 1.5 parts of Ceolus Cream (manufactured by Asahi Kasei K.K.), 8 parts of concentrated yogurt, 7 parts of fat, 0.5 parts of an emulsifying agent, 0.2 parts of sodium lactate and 0.1 parts of calcium lactate were boiled down to a moisture content of 5% in a vacuum cooker. Next, 2.4 parts of gelatin, 0.8 parts of tart flavoring and 0.5 parts of flavoring were mixed in using a pressurized mixer. Furthermore, 5 parts of frappe and 4 parts of fondant were mixed in by means of a kneader, and the resulting mixture was aged overnight. The soft base substance thus obtained and the previously manufactured gummi were stretched while being mixed by means of an extruder, and were thus molded into a square shape with dimensions of 1 cm×1 cm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 26

A soft candy was manufactured in the same manner as in Example 25, except for the fact that the gummi was prepared using cranberry juice instead of the blueberry juice used in Example 25. The soft candy thus obtained produced a novel texture with an enhanced milk sensation, and showed an attractive appearance with scattered red on a white background.

EXAMPLES 27 and 28

Soft candies in which the same gummi as that used in Examples 25 and 26 were manufactured in the same manner as in Example 25, except for the fact that cocoa powder was used instead of the concentrated yogurt used in Example 25, so that a soft candy with a different flavor was used as the base substance. The resulting gummi-containing soft candies produced a novel texture.

EXAMPLE 29

A gummi was manufactured as follows: 38 parts of sugar, 53.8 parts of starch syrup and 2.5 parts of carrageenan were heated and dissolved, and this mixture was then concentrated under reduced pressure. 5 parts of black tea extract, 0.6 parts of tart flavoring, 0.1 parts of sodium citrate, a coloring and a small amount of flavoring were added and uniformly mixed. Using a precision filling machine, a starch mold with a specified volume was filled with this mixture, and the mixture was dried. Afterward, de-powdering and oiling were performed. In this case, the mean unit weight of the finished gummi was set at 0.3 g.

Meanwhile, 27 parts of sugar, 43 parts of starch syrup, 1.5 parts of Ceolus Cream (manufactured by Asahi Kasei K.K.), 8 parts of condensed milk, 7 parts of fat, 0.5 parts of an emulsifying agent, 0.2 parts of sodium lactate and 0.1 parts of calcium lactate were boiled down to a moisture content of 5% in a vacuum cooker. Next, 2.4 parts of gelatin, 0.8 parts of tart flavoring and 0.5 parts of flavoring were mixed in using a pressurized mixer. Furthermore, 5 parts of frappe and 4 parts of fondant were mixed in by means of a kneader, and the resulting mixture was aged overnight. The soft base substance thus obtained and the previously manufactured gummi were stretched while being mixed by means of an extruder, and were thus molded into a square shape with dimensions of 1 cm×0.5 mm; this product was then packaged. The gummi-containing soft candy thus obtained was a soft candy with a novel texture in which the problem of sticking to the teeth was ameliorated; this soft candy had a yogurt flavor with an enhanced milk sensation.

EXAMPLE 30

A soft candy was manufactured in the same manner as in Example 29, except for the fact that a green tea extract was used instead of the black tea extract used in Example 29. The soft candy thus obtained produced a novel texture with an enhanced milk sensation, and showed an attractive appearance with scattered green on a white background.

As is clear from the above description, the novel soft candy of the present invention produces a novel texture with a good flavor and an amelioration of the problem of sticking to the teeth; furthermore, the present invention provides a soft candy in which the flavor is improved while the fragrance is preserved.

What is claimed is:

1. A soft candy in which gummi is dispersed through a candy base substance with a solid content consisting essentially of one or more saccharides, the moisture content of said base substance being 6 to 20 wt %, and said base substance containing 0.001 to 0.3 wt % crystalline cellulose.

2. The soft candy according to claim 1, wherein the solid content of the candy base substance consists essentially of gelatin and one or more saccharides, and gummi with a moisture content of 10 to 20 wt % is dispersed through said base substance at a rate of 5 to 30 wt %.

3. The soft candy according to claim 1 or claim 2, wherein the size of the gummi is 20 to 80% of the height of the soft candy.

* * * * *